United States Patent [19]

Detwiler

[11] 4,185,056
[45] Jan. 22, 1980

[54] METHOD OF MAKING A FLEXIBLE ELASTOMERIC MATRIX AND METHOD OF RETREADING TIRES THEREWITH

[75] Inventor: Richard H. Detwiler, North Windham, Me.

[73] Assignee: Noyes Tire Co., Westbrook, Me.

[21] Appl. No.: 905,005

[22] Filed: May 11, 1978

Related U.S. Application Data

[63] Continuation-in-part of Ser. No. 748,309, Dec. 7, 1976, abandoned.

[51] Int. Cl.² ............................................. B29H 5/04
[52] U.S. Cl. .................................... 264/36; 264/220; 264/315
[58] Field of Search ................. 264/36, 315, 326, 220, 264/501, 502

[56] References Cited
U.S. PATENT DOCUMENTS

| | | | |
|---|---|---|---|
| 2,014,010 | 9/1935 | Wheatley | 264/36 |
| 2,421,099 | 5/1947 | Vogt | 264/36 X |
| 3,743,564 | 7/1973 | Gross | 264/36 X |
| 3,775,528 | 11/1973 | Beneze | 264/315 X |
| 3,779,833 | 12/1973 | Reppel | 264/36 X |
| 3,793,116 | 2/1974 | Schelkmann | 264/36 X |
| 3,983,193 | 9/1976 | Wulker et al. | 264/36 |

*Primary Examiner*—Jan H. Silbaugh

[57] ABSTRACT

A flexible, integrally formed elastomeric matrix is formed using an internal mold such as an inflated tire or carved or molded rigid facsimile thereof covered with a fabric venting network and an overlying layer of elastomeric material. The assembly is cured in the same manner as when tire retreading is effected utilizing precured tread material. After curing, the thus formed flexible matrix with the incorporated venting material is removed and is used in retreading tires prepared in the same manner as in the case where rigid external molds are used but with the curing of the assembly effected in the same way the flexible matrix was prepared.

3 Claims, 8 Drawing Figures

METHOD OF MAKING A FLEXIBLE ELASTOMERIC MATRIX AND METHOD OF RETREADING TIRES THEREWITH

The present application is a continuation-in-part of my co-pending application Ser. No. 748,309, filed Dec. 7, 1976, now abandoned.

BACKGROUND REFERENCES

U.S. Pat. No. 2,014,010
U.S. Pat. No. 2,421,099
U.S. Pat. No. 3,743,564
U.S. Pat. No. 3,775,528
U.S. Pat. No. 3,779,833

BACKGROUND OF THE INVENTION

Historically, the retreading of tires has been to remove the old tread and upper sidewall rubber, apply uncured rubber thereto and then insert the tire into a rigid, treadforming mold or matrix of two or more sections, the mold then heated to above 300° F. Pressure is applied to the inside of the casing of the tire to force it and the rubber into contact with the matrix. Depending on the thickness and compound of the added rubber, the tire is cured until over ninety percent state of cure is reached, at which time it is removed from the matrix.

This conventional type of cure has many variations on how each step is done but all use the same principle and are attended by the following advantages: Ease of compound change, good finished appearance, and the possibility of buying the uncured compound competitively.

It has, however, definite disadvantages including the following: High equipment investment, difficulty in sizing a casing to the correct matrix, and increasing problems as tires become heavier in construction as in the case of truck tires or more radial in construction and hence less prone to fit the normal range of molds.

During the last approximately twenty years, another type of retreading has become prominent, commonly called "precure" retreading. This type of retreading procedure involves using a tread that is cured with its design prior to being applied to the casing. Normally this is produced in rolls by a supplier in the range of sizes and designs required and applied by the retreader of the buffed casing (flat road radius buff) using a thin layer of uncured rubber to bond the precured tread, with its ends abutting, to the old casing. Curing is done with the tire inflated and undistorted and with a flexible membrane or air bag within a chamber in which enough pressure exists to force the tread into contact with the casing with a temperature adequate to enact curing of the bonding layer and with the interior of the bag vented to atmosphere.

This procedure has substantial advantages in that such treads fit the casings perfectly without distortion, a lower capital investment is required, and the tread can be molded under higher pressure.

Attending disadvantages are that the cost of precured rubber tread material versus uncured rubber is high, a large inventory is required to stock all widths and designs, the physical appearance of a retread is not as good at the transition of tread and sidewall as is the case where rigid molds are used, and additionally, the retreading of traction tires with deep sidewall voids is difficult.

THE PRESENT INVENTION

The general objective of the present invention is to enable tires to be retreaded on a more advantageous basis, an objective attained by providing a flexible, integrally formed matrix within which is located a buffed tire provided with the uncured rubber needed for its retreading which is then cured utilizing a procedure much the same as that followed when precured tread material is employed. The term "rubber", as used throughout the specification and claims means any elastomeric material useable in the manufacture of tires or in their retreading.

In more detail, the flexible, integrally formed matrix includes a ring portion of cured rubber having a female, treadforming portion and upper sidewall portions with transversely disposed strands exposed on its inner surface with the strands of a type that serves as an air-venting conduit during curing and with the strand ends exposed at the free margins of the sidewall portions.

Such a matrix is made by using a mold that is either an inflated tire having the desired tread formation or a rigid casting or molding of the same dimensions and having the same tread pattern and the mold diameter is within or can be brought within the approximate range of from 0 to 5% less than the wanted outside diameter of the tire when retreaded. The tread surface of such a mold has the venting strands conveniently in the form of a fabric network placed thereon and an overlying layer of uncured rubber is then added. The thus layered mold is then placed in an envelope or air bag and is then cured with the bag within a chamber where the pressure and temperature are adequate to effect the molding and curing of the rubber layer and with the bag vented to the atmosphere. When the required curing time has elapsed, the layered mold is removed from the bag and the cured layer with the embedded fabric network is separated from the mold as the wanted flexible matrix. Where the male mold is a tire it is inflated before being placed in the bag.

In retreading a tire in accordance with the invention, the tire is conventionally buffed and conventionally provided with uncured rubber as in the case where rigid external molds are used in retreading. The appropriate flexible matrix is then provided with a release coat and slipped over the tire. It is preferred that the flexible matrix used be made within the designated range as slightly undersized ensures its centering relative to the tire to which it is filled. The assembly, with the tire inflated is then placed within an envelope or air bag and cured in much the same manner as in the case where a predetermined length of a precured tread is fitted to a buffed tire with the pressure internally of the tire greater than that externally thereof. The matrix is expandable but limited by the pressure differential.

BRIEF DESCRIPTION OF THE DRAWINGS

In the accompanying drawings, a preferred flexible matrix in accordance with the invention and the method by which it is produced are illustrated as is the preferred method by which a tire is retreaded employing such a matrix. Of the drawings.

THE PREFERRED EMBODIMENT OF THE INVENTION

Figure 1:
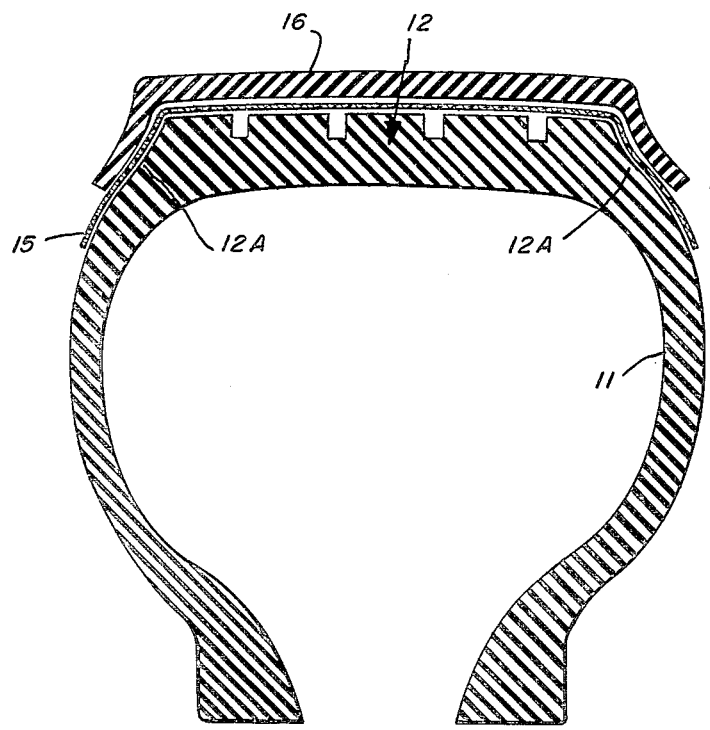
FIG. 1 is a cross section of a male mold, shown as a tire of appropriate size and having a desired tread pattern, with venting material between it and the matrix-forming layer of uncured rubber.

A flexible matrix, generally indicated at 10 is formed, see FIG. 1, by providing a male mold, generally indicated at 11 the outside diameter of which is within the approximate range of from 0 to 5% less than that wanted for the retreaded tire and which has a tread pattern, generally indicated at 12 of the wanted design and dimensions. The mold 11 is shown as a tire provided with an innertube 13 and mounted on a rim 14.

The surface of the mold tire 11 that includes the tread portion 12 and upper sidewall portions 12A is first coated with a mold release and then covered with a fabric network the transverse strands 15 of which are such as to serve as air venting conduits during the curing operation and which are spaced about one inch apart by way of illustration and not of limitation. Uncured rubber is then applied in a conventional manner to provide a layer 16 adequate to form the matrix 10 with a central ring portion 10A and upper sidewall portions 10B with the ends of transversely disposed strands exposed and with the central portion 10A having an appropriately dimensioned female tread pattern 10C.

Figure 2:
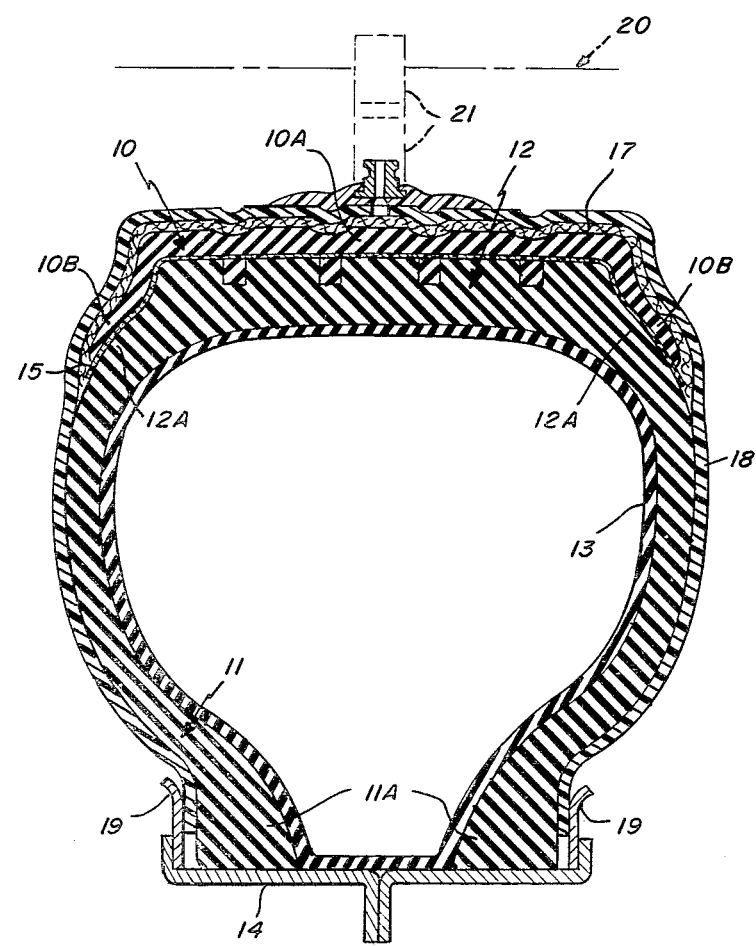
FIG. 2 is a like section of the tire with the matrix being conventionally cured within an envelope or air bag.
Figure 3:
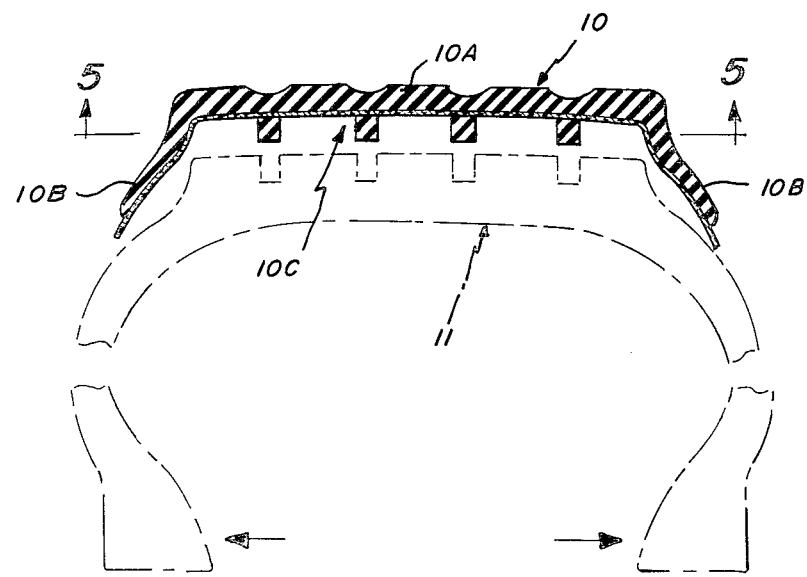
FIG. 3 is a like section of the cured matrix.
Figure 4:
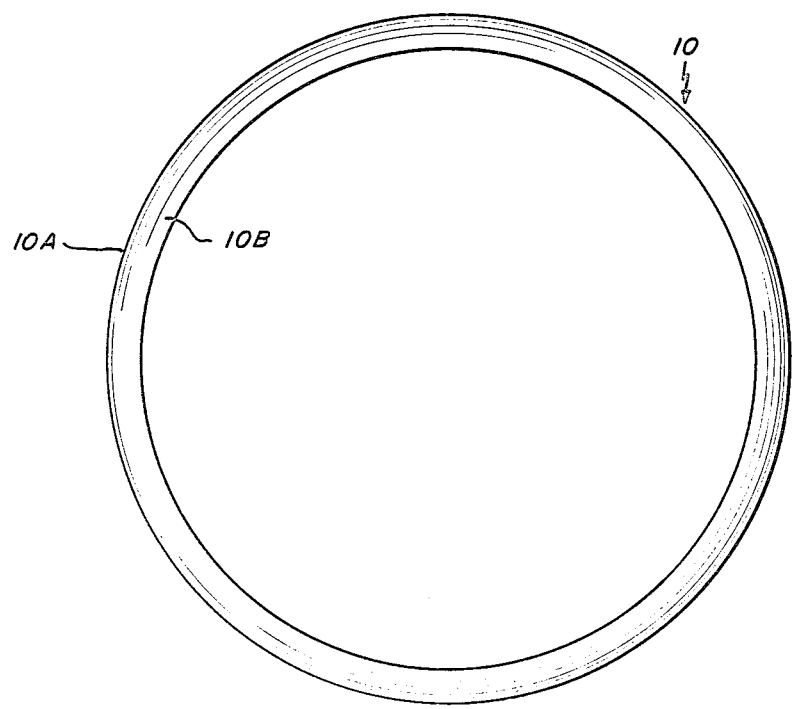
FIG. 4 is a side elevation of the matrix.

The thus layered mold is desirably covered with a wicking or venting material 17, see FIG. 2, and put within a conventional air bag 18 the margins of which are clamped against sealing rings 19, backed by the rim 14, by the beads 11A when the tire 11 is inflated as it is before being placed in a chamber generally indicated at 20. A venting conduit 21 places the interior of the bag 18 in communication with the atmosphere as is conventional, and the pressure and temperature within the chamber 20 are adequate to effect the flow of the rubber into the tread pattern and its curing during a predetermined time interval. Such a chamber may be an electric or steam-heated curing chamber such as is used where retreading is effected with precured tread lengths. Such chambers as are commercially available are limited as to the maximum pressure that can be used for molding, the maximum pressure typically not in excess of 100 lbs. p.s.l. In practice, the mold tire 11 is inflated to provide internal pressure of, say, 115 lbs. p.s.l and the external pressure in the chamber 20 is in the approximate range of from 50 to 85 lbs p.s.l with the upper limits of that range preferred. With the external pressures in the above range and the tire so inflated, the tire, for all intents and purposes is the equivalent of a rigid carving or casting but when a tire is used as the male mold, the internal pressure must be greater than the external pressure, with the pressure differential at least 10 lbs. p.s.l and in practice, in the neighborhood of 30 lbs. p.s.l, and while a greater pressure could be employed, existing equipment is not suited for such higher pressure differentials.

The air bag 18 is then withdrawn from the chamber 20 and the tire 11 removed therefrom following which the flexible matrix 10 is separated from the tire 11. While the matrix 10 may be peeled from the tire, the tire 11 may be deflated and removed from the rim of the wheel and then spread to reduce its outside diameter to an extent facilitating the separation of the matrix 10 therefrom. As is well known, once a tire is removed from a spreader, its inherent resiliency returns it to its original shape.

Figure 5:
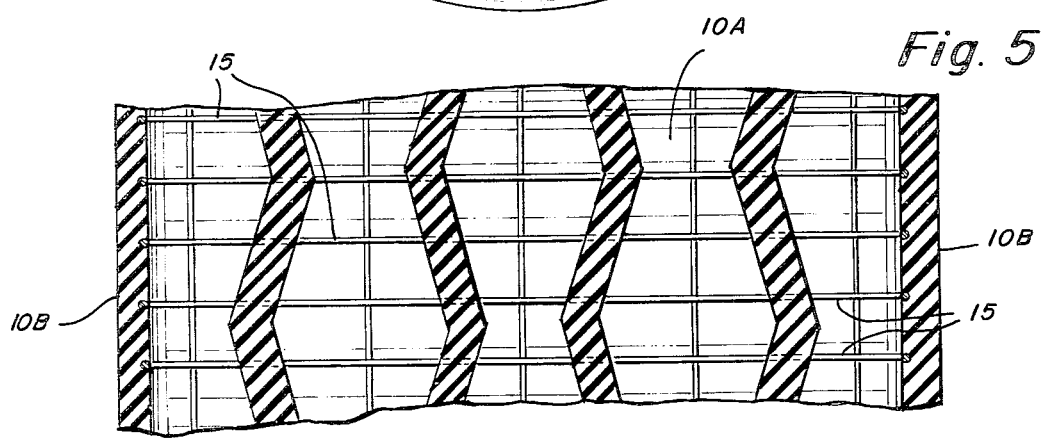
FIG. 5 is a section taken approximately along the indicated line 5—5 of FIG. 3.
Figure 6:
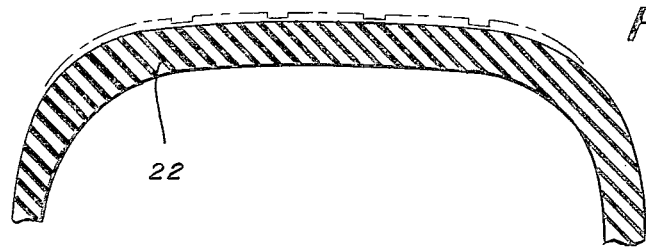
FIG. 6 is a cross section of the tire to be retreaded after the indicated old tread has been conventionally buffed therefrom.
Figure 7:
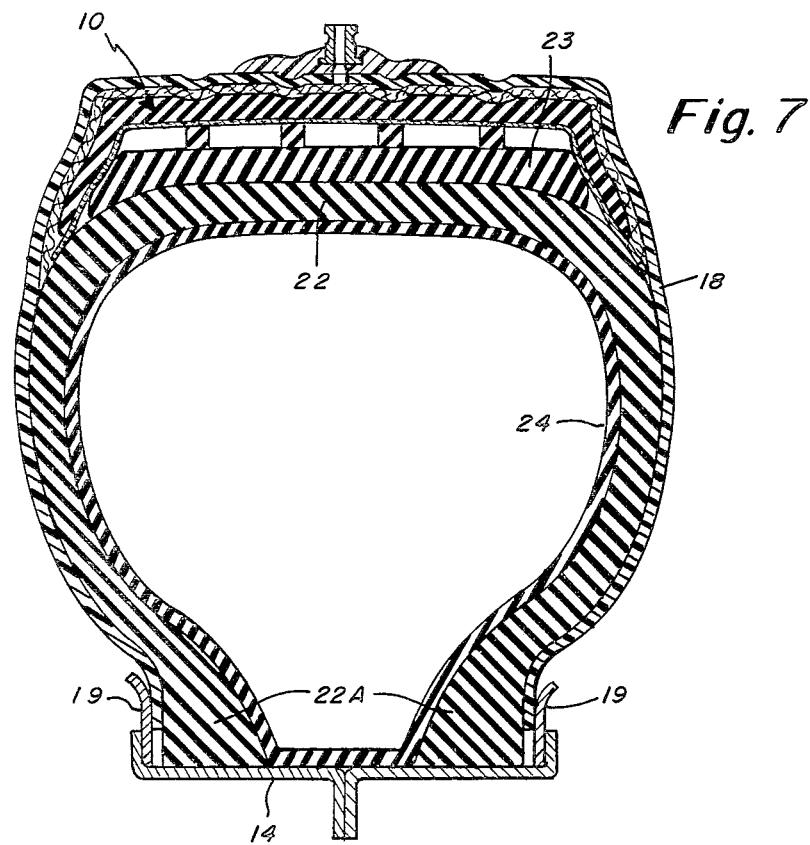
FIG. 7 is a section of the old tire with a layer of uncured, tread-forming rubber formed thereon, the flexible matrix in place and the assembly within an air bag to be cured within a conventional chamber.

The thus formed matrix 10 is then ready for use in retreading a tire 22 that has, see FIG. 5, been buffed in a conventional manner to remove the remaining old tread and some upper sidewall rubber and provide a road radius profile. The buffed area is then covered with an uncured rubber layer 23 in a conventional manner to provide a layer of a thickness and width to cover the buffed area and provide an adequate undertread for the tread pattern. The uncured rubber layer 23 is dusted with zinc stearate which acts as an aid in installing the matrix 10.

Figure 8:
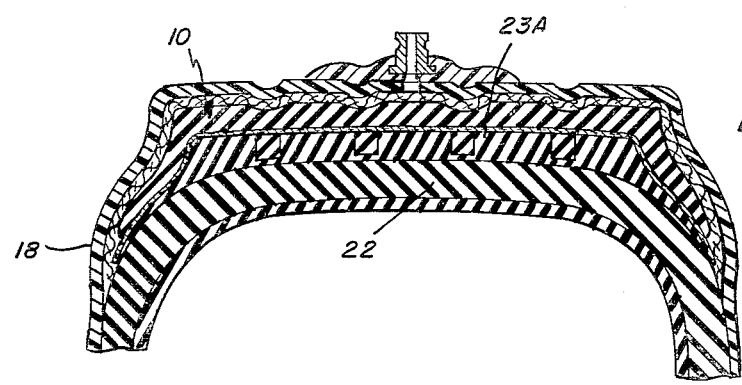
FIG. 8 is a like view of the assembly but with the retread rubber cured.

The interior of the matrix 10 is then coated with a mold release and slipped over the tire 22 with its beads 22A spread apart to reduce the diameter of the tire. The matrix must be centered and is substantially self-centering if made with its dimensions within the desired range once the beads are freed from the spreader to permit the tire to return to its original state. For that reason it is preferred that the inside diameter of the matrix be less than the wanted outside diameter of the retreaded tire. The tire 22 with a tube 24 is mounted on a rim 14 provided with sealing rings 19 and is then inflated. The assembly is then placed in the air bag 18 and the rubber layer molded and cured within the chamber 20 in the same manner as was the flexible matrix 10. The differential pressure resulting when the tire 22 is inflated, desirably, as above stated, in the neighborhood of 30 lbs. p.s.l, is adequate to expand the matrix 10 to enable the outside diameter of the retreaded tire 22 to be that of the original tire, with the retreaded portion indicated at 23A in FIG. 8. When the cured assembly is removed, the flexible matrix 10 with its incorporated air venting means is separated from the retreaded tire by following the procedure described in connection with its formation and is ready for re-use.

I claim:

1. The method of forming a flexible matrix for use in retreading tires that has been buffed and provided with a layer of uncured rubber adequate to provide a new tread and sidewall portions for the buffed area of the tire when retreaded, said method comprising the steps of selecting a male mold that represents the transverse contour wanted for the tread and selected sidewall portions of said tire when retreaded, has the wanted design and dimensions, and is within the approximate range of from 0–5% less than the wanted outside diameter of the tire when retreaded, placing transverse strands of venting material about the male mold with their free ends extending at least to the outer edges of said sidewall portions, forming on the male mold an overlying layer of uncured rubber having cross sectional dimensions appropriate for forming the tread and sidewall portions of the matrix on the mold, and then molding the thus layered surface against the male mold with heat and pressure and for a time such as to cure and mold the rubber and secure said strands thereto while simultaneously permitting air between the underlying and overlying layers to escape via said venting means, and then removing the cured layer as a somewhat elastic, flexible matrix including an internal, female, tread-forming ring portion and sidewall portions with the strands embedded in and substantially continuously exposed on the said internal surface with free ends extending at least to the margins of the side portions thereof, and the additional steps of then spreading one of said buffed and layered tires, placing the matrix over the spread, layered tire with a mold release between the matrix and the uncured rubber layer, releasing the spread tire to permit it to return to its normal shape and to bring the sidewall portions of the buffed area against the side portions of the matrix, inflating the tire and subjecting the layered tire to a curing temperature and an external pressure greater than its internal pressure for a predetermined interval and simultaneously venting via the transverse strands any air entrapped between the matrix and the tire, and then deflating the retreaded tire and removing the matrix therefrom for re-use on another of said tires in the same manner.

2. The method of claim 1 in which the step of placing transverse strands of venting material includes the placing of a fabric network about the male mold.

3. The method of claim 1 and the additional step of covering the uncured rubber with a fabric before inserting the layered male mold into the air bag.

* * * * *